United States Patent
Numao et al.

(10) Patent No.: US 7,651,798 B2
(45) Date of Patent: Jan. 26, 2010

(54) FUEL CELL SYSTEM WITH REFORMER RESPONSE TIME CORRECTION

(75) Inventors: Yasuhiro Numao, Zushi (JP); Yasukazu Iwasaki, Yokohama (JP)

(73) Assignee: Nissan Motor Co. Ltd., Kanagawa (JP)

( * ) Notice: Subject to any disclaimer, the term of this patent is extended or adjusted under 35 U.S.C. 154(b) by 442 days.

(21) Appl. No.: 10/433,664

(22) PCT Filed: Jan. 15, 2003

(86) PCT No.: PCT/JP03/00241

§ 371 (c)(1),
(2), (4) Date: Jun. 6, 2003

(87) PCT Pub. No.: WO03/071622

PCT Pub. Date: Aug. 28, 2003

(65) Prior Publication Data

US 2004/0234825 A1      Nov. 25, 2004

(30) Foreign Application Priority Data

Feb. 22, 2002    (JP) ............................. 2002-046260

(51) Int. Cl.
*H01M 8/06* (2006.01)
*H02J 1/14* (2006.01)
(52) U.S. Cl. ............................. 429/13; 429/23; 320/134
(58) Field of Classification Search .................. 429/24, 429/13; 320/132, 136, 153; 700/296, 299
See application file for complete search history.

(56) References Cited

U.S. PATENT DOCUMENTS

| | | | |
|---|---|---|---|
| 5,334,463 A | * | 8/1994 | Tajima et al. .................. 429/9 |
| 5,631,532 A | | 5/1997 | Azuma et al. |
| 5,964,309 A | | 10/1999 | Kimura et al. |
| 6,015,634 A | * | 1/2000 | Bonville et al. ................ 429/17 |
| 2002/0175657 A1 | * | 11/2002 | Leboe ......................... 320/132 |

FOREIGN PATENT DOCUMENTS

| | | |
|---|---|---|
| EP | 09007618 | 1/1997 |
| EP | 1 091 437 | 4/2001 |
| JP | 04-51466 | 2/1992 |
| JP | 09-7618 | 1/1997 |
| JP | 2002-034171 A | 1/2002 |

* cited by examiner

*Primary Examiner*—Patrick Ryan
*Assistant Examiner*—Keith Walker
(74) *Attorney, Agent, or Firm*—McDermott Will & Emery LLP

(57) ABSTRACT

A fuel cell system cooperating with a rechargeable battery (18) mounts a fuel cell (12) as a source of motive power in an electric vehicle with an electric motor. The fuel cell system and the rechargeable battery (18) supplies the electric motor with electrical power. The fuel cell system also includes a reformer (11) as a source of hydrogen hydrogen-containing gas supplied to the fuel cell (12). The fuel cell system comprises a temperature sensor (19) for measuring the temperature (Tb) of the rechargeable battery and a controller (16) for controlling the response characteristics (mainly the response characteristics of the reformer) of the fuel cell system based on the measured temperature (Tb). The controller (16) calculates a response time of the fuel cell system based on the measured temperature, and controls the supply of hydrogen-containing gas to the fuel cell in response to the calculated response time.

6 Claims, 7 Drawing Sheets

FUEL CELL SYSTEM WITH REFORMER RESPONSE TIME CORRECTION

FIELD OF THE INVENTION

This invention relates to a fuel cell system, and in particular a fuel cell system cooperating with a rechargeable battery.

BACKGROUND OF THE INVENTION

Tokkai-Hei 04-051466 published by the Japanese Patent Office in 1992 discloses a fuel cell system cooperating with a rechargeable battery. The fuel cell system and the rechargeable battery are connected to a load circuit, supplying the load circuit with electrical power. In this conventional fuel cell system, when the required power for the load circuit exceeds the power generation amount of the fuel cell, the rechargeable battery performs discharge operations. When the required power for the load circuit is less than the generation amount of the fuel cell, excess power produced by the fuel cell is regenerated to the battery.

A fuel-reforming fuel cell system disclosed in Tokkai-Hei 09-007618 published by the Japanese Patent Office in 1997 reduces the capacity of the rechargeable battery cooperating with the fuel cell system by regulating the response speed of the reformer in the fuel cell system according to the rate of change in the required power for the load circuit.

SUMMARY OF THE INVENTION

However when the operation of the reformer is controlled to suppress the response speed of the reformer with respect to the required power for fuel cell system and to suppress variation in the output of the reformer, the output requirements on the rechargeable battery increases. This results in temperature increases in the rechargeable battery and causes deterioration or damage to the rechargeable battery.

It is therefore an object of this invention to provide an efficient fuel cell system which controls the response characteristics of the fuel cell system based on the thermal conditions of the rechargeable battery, for example the temperature of the rechargeable battery.

In order to achieve above object, this invention provides a fuel cell system connected to a motor and a rechargeable battery, and provided with a fuel cell and a source of hydrogen-containing gas supplied to the fuel cell, the fuel cell system and the rechargeable battery (18) supplying the motor with electrical power. The fuel cell system comprises a temperature sensor for detecting a temperature of the rechargeable battery, a load sensor for detecting a required power for the motor, and a controller coupled to the temperature sensor and the load sensor. The controller functions to calculate a response time of the fuel cell system based on the detected temperature of the rechargeable battery when detecting a change in the required power for the motor; and control the supply of hydrogen-containing gas to the fuel cell according to the calculated response time.

The details as well as other features and advantages of this invention are set forth in the remainder of the specification and are shown in the accompanying drawings.

BRIEF DESCRIPTION OF THE DRAWINGS

FIG. 9($a$) shows maps when Rt=3 seconds. FIG. 9($b$) shows maps when Rt=7 seconds.

DESCRIPTION OF THE PREFERRED EMBODIMENTS

Figure 1:
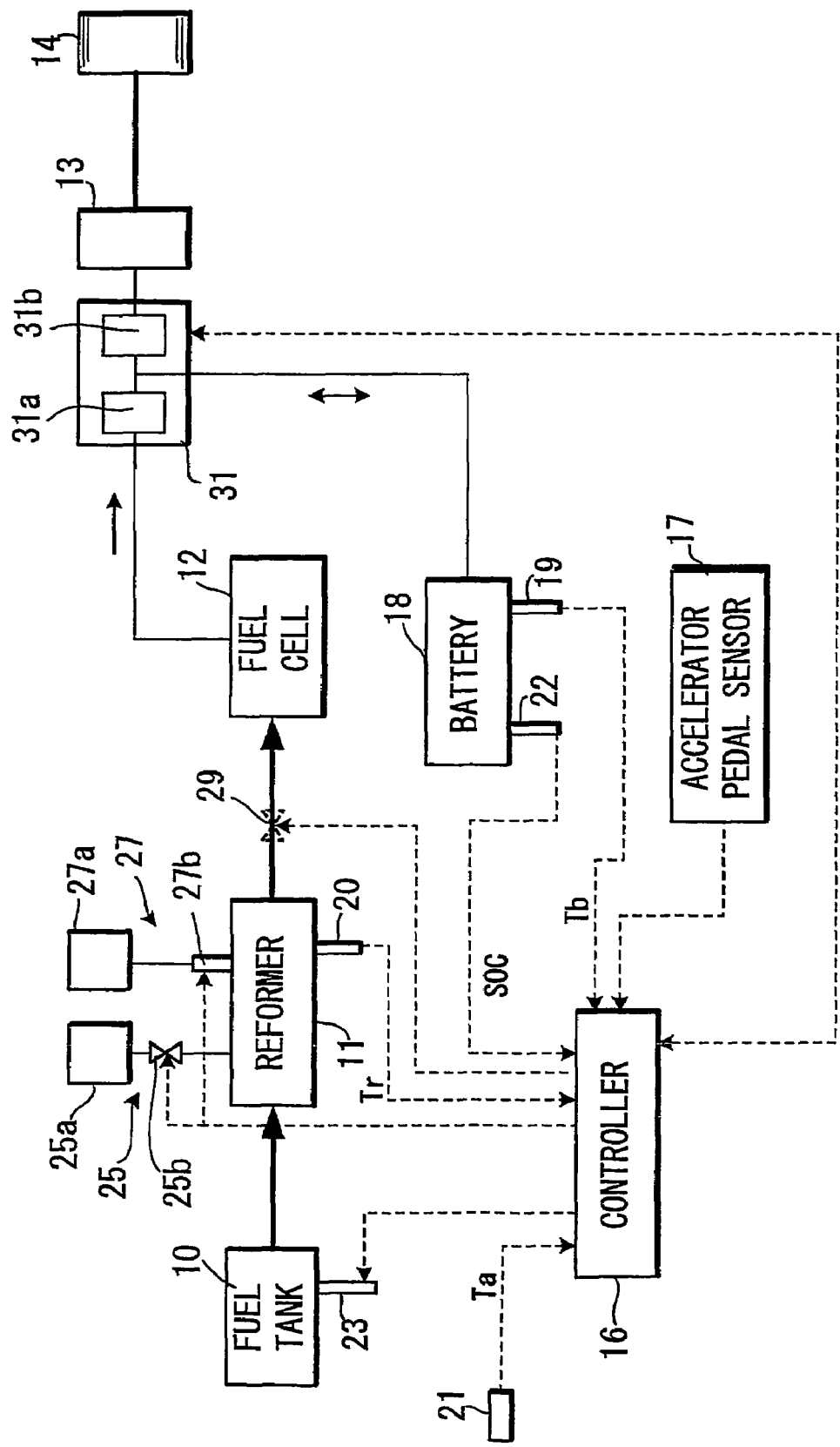
FIG. 1 is a schematic diagram of the structure of a fuel cell system according to this invention.

FIG. 1 shows a reforming-type fuel cell system applying this invention. This fuel cell system is used in an electric vehicle or any moving object requiring electric power. Fuel supplied from a fuel tank 10 undergoes reforming reactions in a reformer 11 in order to produce a hydrogen-rich reformate gas. Thus, the reformer 11 functions as a source of hydrogen-containing gas. The reformate gas and air are supplied to a fuel cell 12 to cause the fuel cell 12 to perform power generation operations. The generated power is supplied to a motor 13 via a power control circuit 31. In this manner, the motor 13 is driven. An air supply device 25 provided with an air compressor 25$a$ and an air flow rate control valve 25$b$ supplies air to the reformer 11. A water supply device 27 provided with a water source 27$a$ and a water flow rate control valve 27$b$ supplies water to the reformer 11. Optionally, a flow rate control valve 29 which controls the flow amount (flow rate) of reformate gas from the reformer 11 may be provided between the reformer 11 and the fuel cell 12. The motor 13 is connected to the vehicle wheels 14 so that the vehicle may be driven as a result of the motor 13 rotating the vehicle wheels 14.

The controller 16 is a microcomputer provided with a central processing unit (CPU), a read only memory (ROM), a random access memory (RAM) and an input/output interface (I/O interface). The controller 16 may comprise a plurality of microcomputers. The controller 16 is electronically connected to the accelerator pedal sensor 17, a first temperature sensor 19, a second temperature sensor 20, a third temperature sensor 21, a fuel flow rate control valve 23, an air supply device 25, a water supply device 27 and a power control circuit 31. The controller 13 receives/outputs signals from/to these components.

A battery 18 which functions as a rechargeable battery is disposed in parallel with the fuel cell 12. The controller 16 controls the power supplied from the battery 18 to the motor 13 via the power control circuit 31 based on the power amount required for driving the motor 13 and the power generation amount of the fuel cell 12. When the power generation amount of the fuel cell 12 is smaller than the required power for the motor 13, the power from the battery 18 is supplied to the motor 13 via the power control circuit 31. When the power generation amount of the fuel cell 12 is greater than the required power for the motor 13, the power from the fuel cell 12 is supplied to the battery 18 via the power control circuit 31 using excess generated power from the fuel cell 12. Further, the power control circuit 31 has a function of detecting the generated power amount of the fuel cell 12.

The motor 13 may be an alternating current motor. In this case, the power control circuit 31 includes a DC-DC conversion circuit 31a for regulating the voltage of the fuel cell 12 and an inverter circuit 31b for converting the direct current of the fuel cell 12 or the battery 18 into an alternating current supplied to the motor 13. The inverter circuit 31b converts the alternating current supplied from the motor 13 into the direct current of the fuel cell 12 or the battery 18 in a power-regenerating operation. The DC-DC conversion circuit 31a is connected to the battery 18 and the inverter circuit 31b. The power from the fuel cell 12 is supplied to the motor 13 via the DC-DC conversion circuit 31a and the inverter circuit 31b, or to the battery 18 via the DC-DC conversion circuit 31a.

The controller 16 calculates the required power (required load) of the motor 13 based on a signal from the accelerator pedal sensor 17 (load sensor) which detects the depression amount of the accelerator pedal. The depression amount of the accelerator pedal indicates the required load (power) of the motor 13. When the depression amount on the accelerator pedal increases, the required power for the motor 13 increases. The memory of the controller 16 stores a map (not shown) specifying the relationship of the depression amount of the accelerator pedal and the required power amount.

The fuel flow rate control valve 23 is provided in the fuel tank 10 and controls the flow rate of fuel. The controller 16 controls the opening of the fuel flow rate control valve 23.

The fuel cell system is provided with a first temperature sensor 19 which detects the temperature of the battery 18 as a thermal condition of the battery 18, a second temperature sensor 20 which detects the temperature of the reformer 11, a third temperature sensor 21 which detects the ambient temperature of the external portion of the fuel cell system, and a battery sensor 22 which measures the state of charge (SOC) of the battery. Signals from these sensors are input into the controller 16 through the I/O interface. The battery sensor 22 is a sensor which integrates the time and the current value of the charging/discharging current in the battery 18 to measure the state of charge of the battery 18. However it is not limited in this regard. The battery sensor 22 may also be adapted to detect the current value of the charging/discharging current and thereafter the controller 16 integrates the current value over time.

Figure 2:
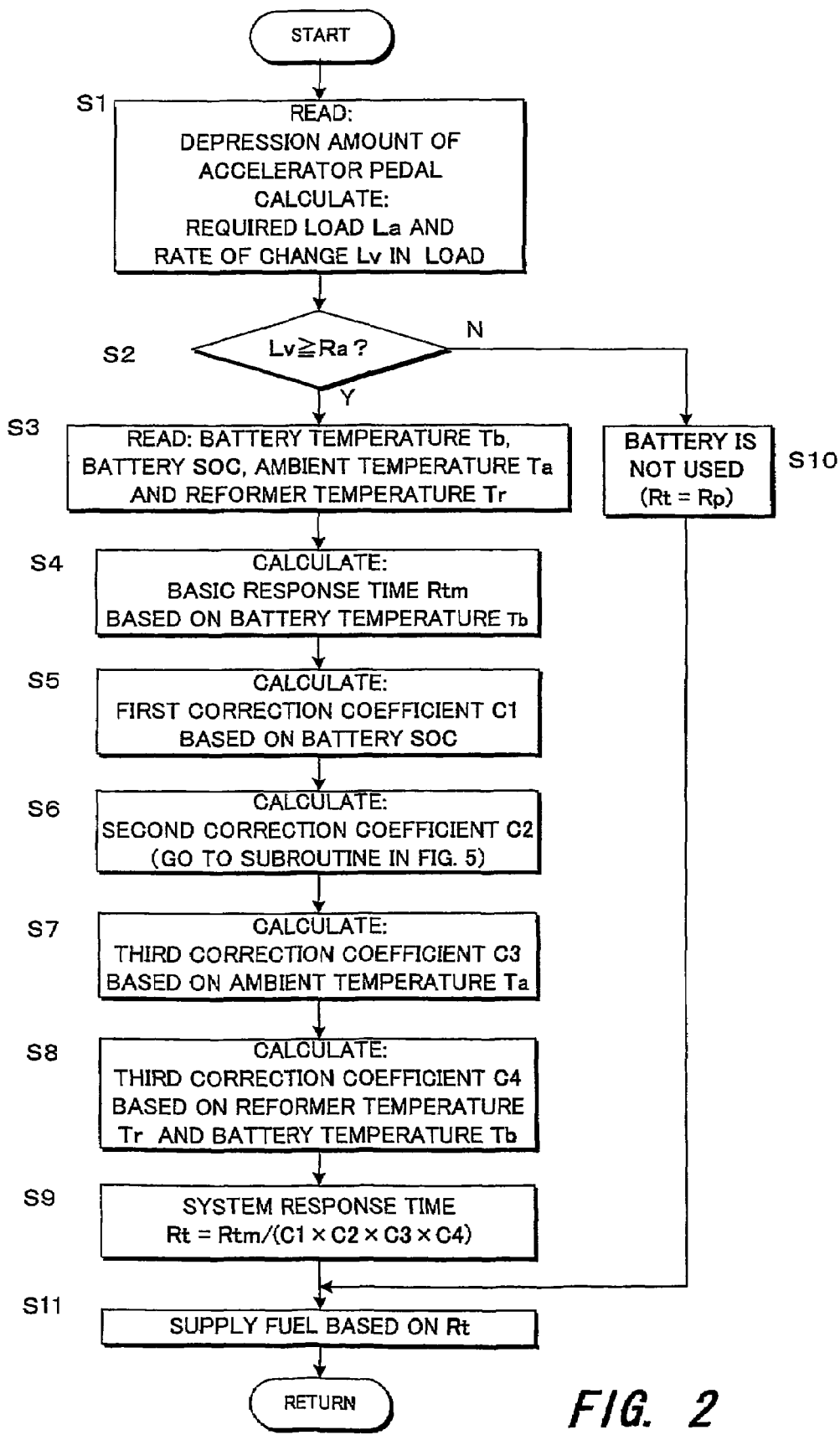
FIG. 2 is a flowchart showing the main routine for calculating a system response time Rt.

A control routine for controlling the response characteristics of the fuel cell system will be described hereafter based on the flowchart in FIG. 2. The controller 16 performs the control routine at regular execution intervals Tp which may be 3 seconds.

The response characteristics of the reformer and the response characteristics of the fuel cell system are response characteristics which have a large effect on the performance of the vehicle. The response time of the fuel cell system may be defined as an elapsed time from the driver operating the accelerator pedal (from the occurrence of the change in the required power for the motor 13) until the required power of the motor 13 has been reached by the fuel cell 12. When a target flow rate of fuel which depends on the depression amount of the accelerator pedal, the temperature of the reformer and the SOC of the battery is reformed by the reformer, the fuel cell 12 can generate the required power of the motor 13. The controller 16 calculates the target flow rate of fuel which produces a target flow rate of hydrogen-containing gas corresponding to the required power of the motor 13, and at the target flow rate of fuel, the fuel cell 12 can generate the required power of the motor 13.

The response time of the reformer may be defined as an elapsed time from the driver operating the accelerator pedal (from the occurrence of the change in the required power for the motor 13) until a target flow rate of hydrogen-containing gas has been produced by the reformer. The target flow rate of hydrogen-containing gas is a flow rate at which the fuel cell 12 can generate the required power of the motor 13.

Since the response of the reformer 11 is slow, the response speed of the reformer 11 is most dominant with respect to the response speed of the fuel cell system. Namely, the response time of the fuel cell system is nearly equal to the response time of the reformer. Thus the control performed by this invention operates in order to coordinate the operations of the rechargeable battery and the reformer.

Firstly in a step S1, the dimension La of the load required by the motor 13 and the rate of change Lv in the load (change of load per unit time) are read. The rate of change Lv is calculated based on the dimension La of the load required by the motor 13 based on the signal from the accelerator pedal sensor 17 and the present output power of the fuel cell 12.

Then in a step S2, it is determined whether the rate of change Lv in the load is greater than a threshold value Ra. When the rate of change Lv in the load is smaller than the threshold value Ra, the variation in the load is gentle and may be dealt with only using the fuel cell (not using the battery 18). Thereafter the routine proceeds to a step S10. In the step S10, the operation of the fuel cell system is continued at a predetermined response speed Sa, that is to say, at a predetermined response time Rp. The response time Rt of the fuel cell system is set to a predetermined response time Rp (Rt=Rp). The predetermined response time Rp is in the range of 5 to 10 seconds. Preferably the predetermined response time Rp takes a value of 7 seconds. Thereafter the routine proceeds to a step S11. If the rate of change Lv is greater than or equal to the threshold value Ra, it is determined that there is a rapid variation in the load, requiring a power supply from the battery 18. In this case, the routine proceeds to a step S3 where the battery temperature Tb, the battery state of charge (SOC), the ambient temperature Ta and the reformer temperature Tr are read from the respective sensors.

For example, the threshold value Ra for the rate of change Lv in load is set to 10 (%/second) when taking maximum load as 100%. That is to say, when the load variation is greater than 10% per second, the routine proceeds to the step S3.

Then in steps after a step S4, the actual calculation of the response time Rt of the fuel cell system is performed. The response time Rt of the fuel cell system is given by an equation of $Rt=Rtm/(C1 \times C2 \times C3 \times C4)$. Here Rtm is a basic response time and C1, C2, C3, C4 are correction coefficients.

Figure 3:
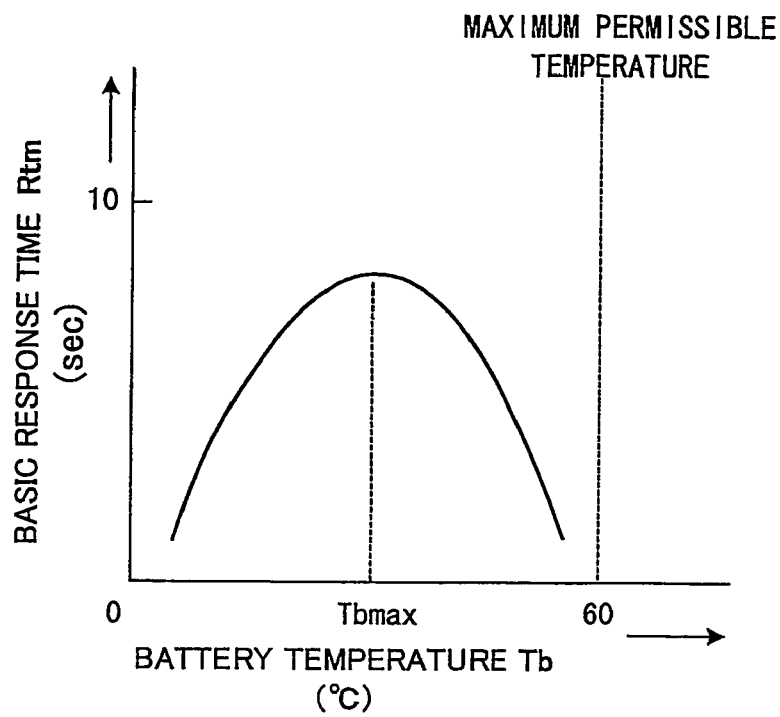
FIG. 3 is a map for calculating a system basic response time Rtm.

Firstly in the step S4, a basic response time Rtm of the fuel cell system is calculated using a main map (shown in FIG. 3) specifying the relation between the basic response time Rtm of the fuel cell system and the battery temperature Tb. The main map of FIG. 3 is stored in the memory of the controller 16. The calculation is performed based on values for the battery temperature Tb. The basic response time Rtm increases with increasing battery temperature Tb below a predetermined battery temperature Tbmax, and decreases with increasing battery temperature Tb above the predetermined battery temperature Tbmax, taking a maximum value at the predetermined battery temperature Tbmax. The predetermined battery temperature Tbmax ranges from 0 degrees C. to a maximum permissible temperature (for example 60 degrees C.) of the battery 18. The battery 18 is damaged or undergo deterioration above the maximum permissible temperature.

For this reason, the main map is adapted so that when the battery temperature Tb approaches the maximum permissible temperature, the basic response time Rtm is reduced substantially to zero in order to increase the response speed of the fuel cell system. The power supply from the battery 18 is reduced by increasing the response speed of the fuel cell system.

Consequently it is possible to control the battery temperature Tb to less than or equal to the maximum permissible temperature and thus to take precautionary measures to avoid damage or deterioration to the battery 18.

Next in a step S5, a first correction coefficient C1 is calculated so as to correct the basic response time Rtm for the system in response to the SOC of the battery 18.

Figure 4:
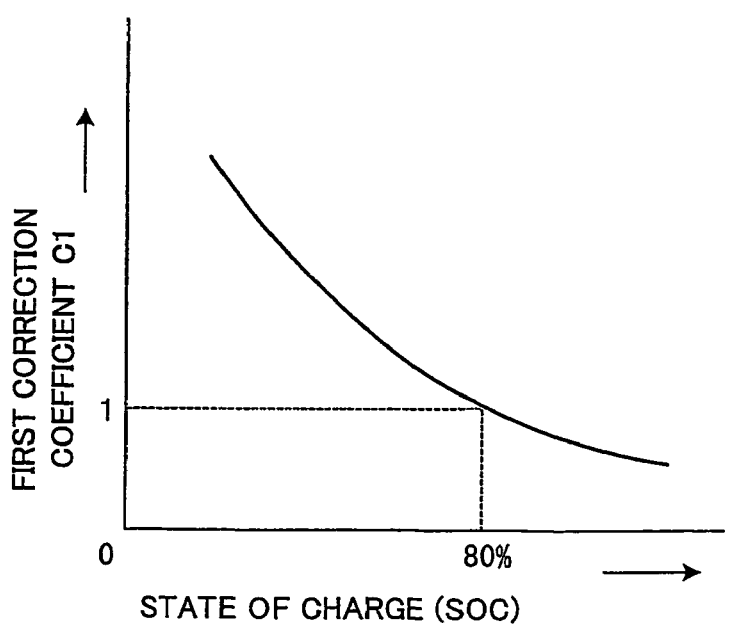
FIG. 4 is a map for calculating a correction coefficient C1.

The calculation of the first correction coefficient C1 uses a map as shown in FIG. 4 and comprises reading the first correction coefficient C1 for the response time from the SOC value. The map of FIG. 4 is stored in the memory of the controller 16. In the map, as the SOC value increases, the first correction coefficient C1 decreases so that the response time Rt of the fuel cell system is increased with the SOC value. Thus, when the SOC value is large, battery power is consumed and increases in the SOC value are suppressed. The fuel cell system can adapt the response time Rt in response to the SOC of the battery 18.

Figure 5:
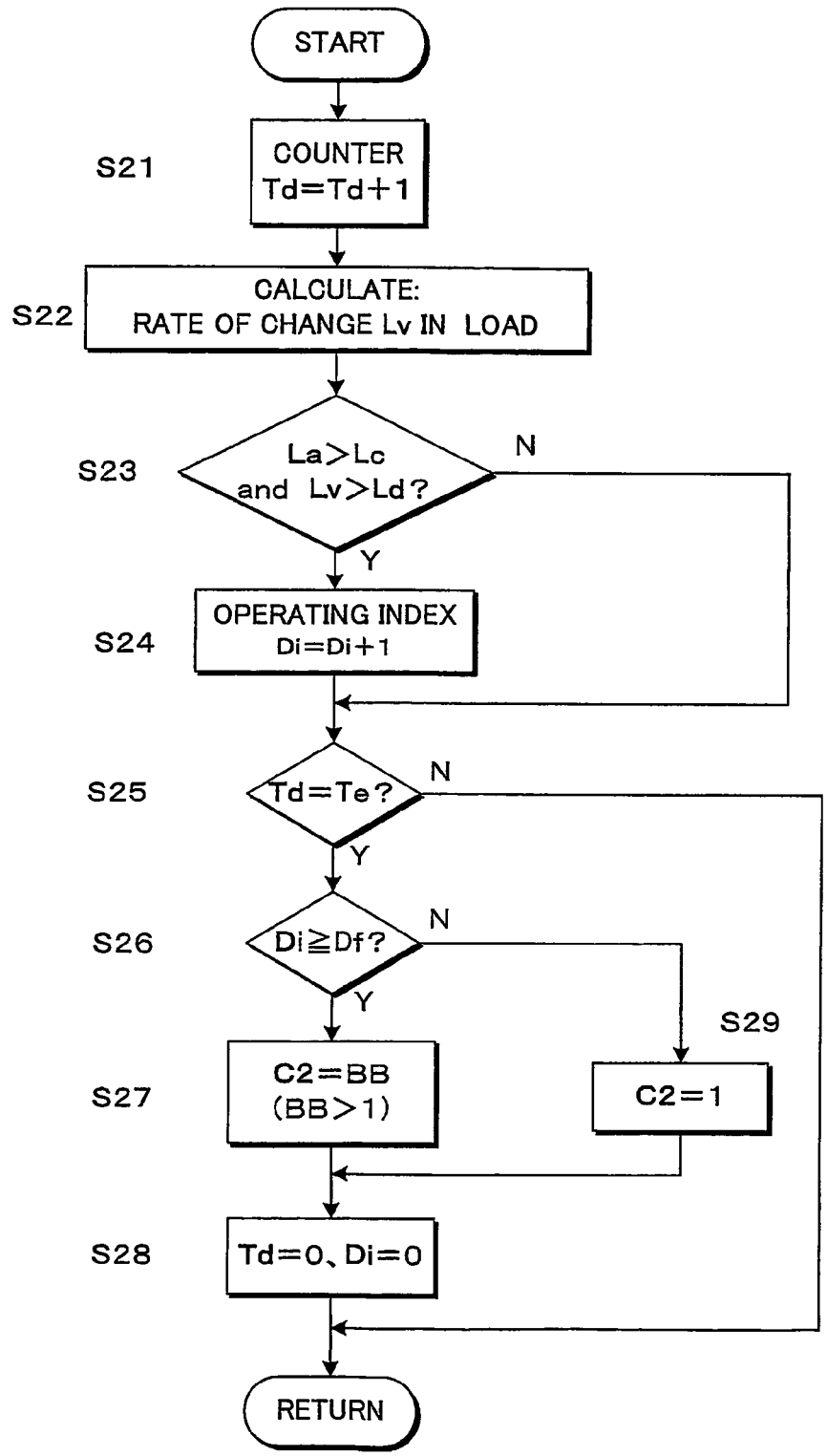
FIG. 5 is a flowchart of a subroutine for calculating a correction coefficient C2.

Then in a step S6, the calculation as shown in the subroutine in FIG. 5 is performed. In the subroutine in FIG. 5, classification of the operating conditions of the vehicle is performed. In this step, it is determined how frequently the rate of change Lv in the load of the motor 13 exceeds a threshold value Ld per unit time Te (how frequently rapid variation occurs in the load) under the condition that the load La is greater than a predetermined value Lc. This is in order to determine the operating conditions of the vehicle.

Figure 6:
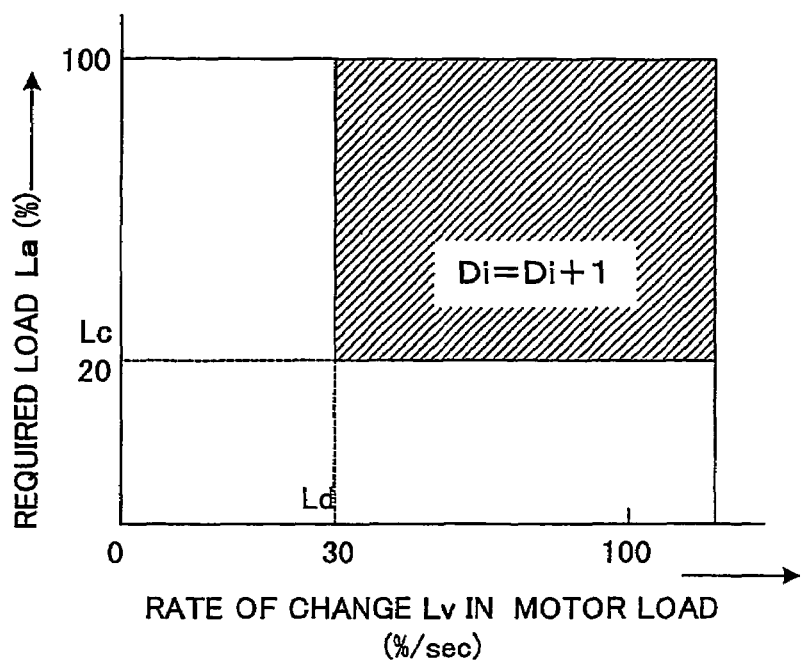
FIG. 6 is a map for determining the operating condition of the vehicle.

Firstly in a step S21, a value of one is added to the counter value Td for time. In a step S22, the rate of change in the load Lv (%/sec) is calculated. In a step S23, it is determined whether or not the dimension La for the required load based on the detected value of the accelerator pedal sensor 17 is greater than a threshold value Lc (for example 20%) and whether the rate of change in the load Lv (%/sec) is greater than a threshold value Ld (for example 30%/sec). When the dimension La (%) of the required load is greater than the threshold value Lc and the rate of change Lv (%/sec) in the load is greater than the threshold value Ld as shown in the map of FIG. 6, the routine proceeds to a step S24 where a value, one added to the current operating index Di, is set as a new operating index Di. The main map of FIG. 6 is stored in the memory of the controller 16. FIG. 6 is used in determining the operating condition of the vehicle. When the dimension La (%) of the required load and the rate of change Lv (%/sec) in the load are within the hatched area of FIG. 6, it is determined that the vehicle is rapidly accelerated. Then, the operating index Di is increased by a value of one. The operating index indicates frequency of the rapid variation in the load or frequency of the rapid acceleration of the vehicle.

In the step S25, when the counter value Td for time has reached a fixed value Te, the routine proceeds to a step S26 so as to determine the operating conditions of the vehicle. On the other hand, in a step S25, when the counter value Td for time is less than the fixed value Te, the routine returns to the step S1. The fixed value Te is a value ranging from 60/Tp to 300/Tp. The predetermined time Tp as described above represents the execution interval of the main routine shown in FIG. 2. When the predetermined time Tp is three seconds, the fixed value Te takes a value from 20 to 100.

In a step S26, it is determined whether or not the operating index Di is greater than or equal to a threshold value Df. The threshold value Df depends on the execution time (Tp) of the control routine and is a value which corresponds to an increase in the operating index Di of ten times per minute. When the operating index Di is greater than or equal to the threshold value Df, the vehicle is operating under conditions in which the load of the motor 13 is large and the fluctuation in the required load is also large. In this case, in a step S27, the second correction coefficient C2 is set to BB (C2=BB). Herein BB is a constant greater than one. After the second correction coefficient C2 is calculated, the values for Td, Di are reset to zero in a step S28. When the load and the load fluctuation both take large values, the response speed of the fuel cell system are increased and the power supplied from the battery 18 is decreased by setting the second correction coefficient C2 to a value which is larger than one.

In the step S26, when Di is less than the threshold value Df, the routine proceeds to a step S29 and the second correction coefficient C2 is set to a value of one. The routine thereafter proceeds to a step S28.

In this manner, the variation in load of the motor 13 in a unit time Te and the dimension of the load of the motor 13 is calculated on the basis of the detected value from the accelerator pedal sensor 17. Then, the classification of the operating conditions of the vehicle is performed based on the calculation result and the response speed of the reformer 11 are corrected. In this manner, when the load La and the variation Lv in the load are large, a correction to increase the response speed Rt of the reformer 11 is performed in order to prevent deterioration of the battery 18.

Figure 7:
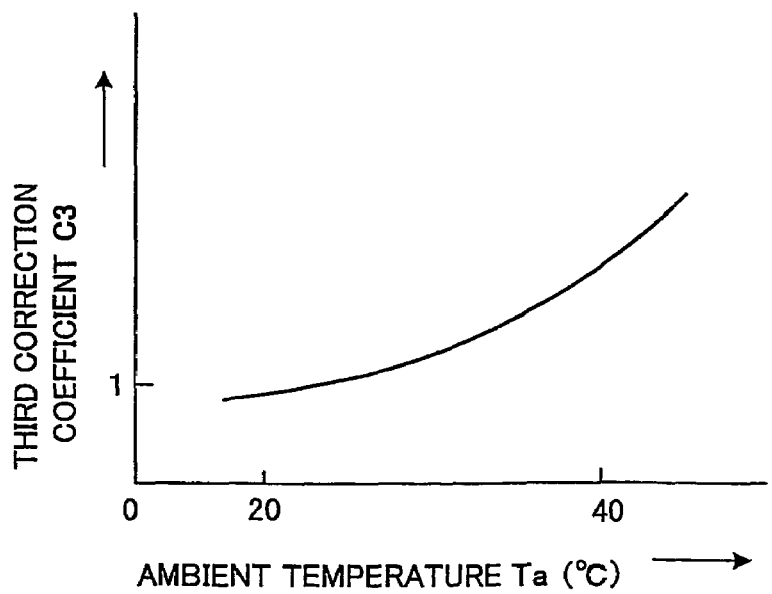
FIG. 7 is a map for calculating a correction coefficient C3.

After completion of the subroutine, in a step S7, a third correction coefficient C3 is calculated based on the ambient temperature Ta detected by the third temperature sensor 21. Using the map shown in FIG. 7, the third correction coefficient C3 for the system response time is calculated based on the ambient temperature Ta. The map of FIG. 7 is stored in the memory of the controller 16. The characteristics of the map shown in FIG. 7 are such that the third correction coefficient C3 increases as the ambient temperature Ta increases. Thus, since the response time Rt of the fuel cell system decreases with increasing ambient temperature Ta, it is possible to reduce the load on the battery 18 at high temperatures and to prevent deterioration in the battery 18.

Furthermore the cooling efficiency of the battery increases as the ambient temperature Ta decreases. For example, the cooling efficiency of the battery is higher when the ambient temperature is 20 degrees C. than when the ambient temperature is 40 degrees C. Consequently when the ambient temperature Ta is low, the response time Rt of the fuel cell system is relatively large so that the battery 18 supplies a relatively large amount of power.

Figure 8:
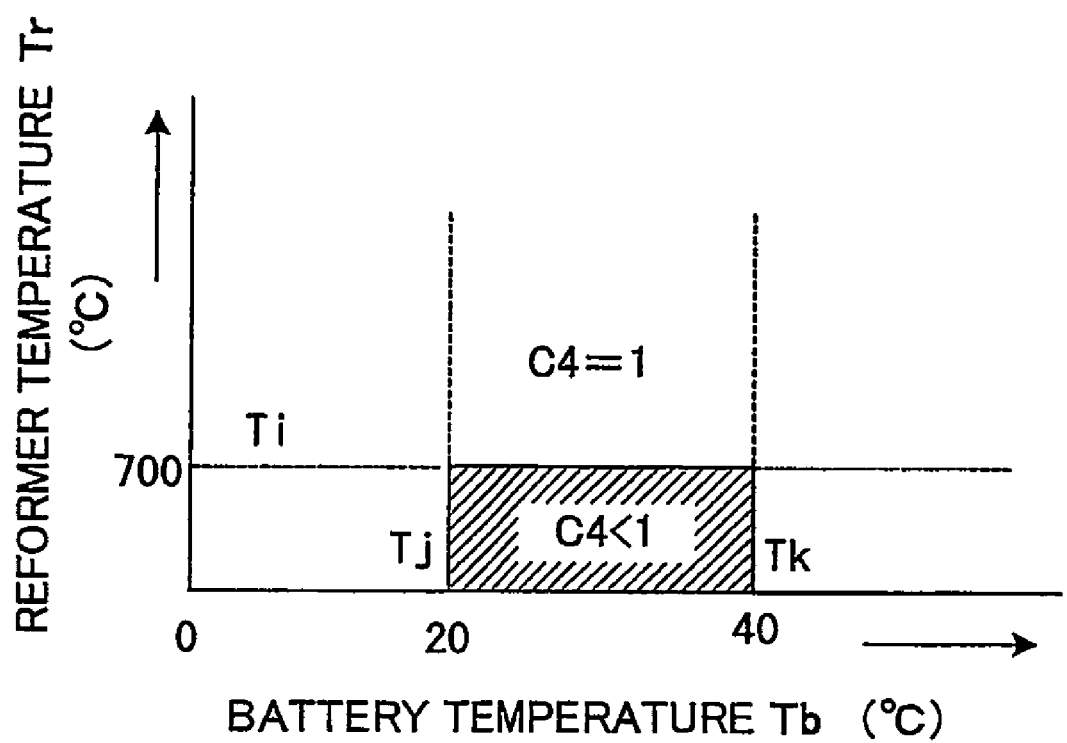
FIG. 8 is a map used for calculating a correction coefficient C4.

Then in a step S8, using the map shown in FIG. 8, a fourth correction coefficient C4 for the system response time is calculated based on the reformer temperature Tr. The map of FIG. 8 is stored in the memory of the controller 16. When the reformer temperature Tr is less than a threshold value Ti and the battery temperature Tb is less than the threshold value Tk and greater than a threshold value Tj, the correction coefficient C4 is set to DD (C4=DD). Here DD is a constant smaller than one. In all other cases, the fourth correction coefficient C4 is set to a value of one (C4=1). The threshold value Ti for example represents the catalyst activation temperature 700 degrees C. of the reformer 11. The threshold value Tj is a temperature of 20 degrees C. for example. The threshold value Tk is a temperature of 40 degrees C. for example.

The characteristics of the map shown in FIG. 8 are such that the response characteristics of the fuel cell system are corrected so that power supply from the battery 18 is increased when the temperature of the reformer 11 is less than a predetermined temperature Ti (for example, less than the catalyst activation temperature) and the temperature of the battery 18 is in a suitable temperature region (the temperature region bounded by the threshold values Tj and Tk). Thus when the temperature of the reformer 11 is less than the activation temperature for the catalyst for example, the response characteristics of the system are corrected so that the power supply amount from the battery 18 is increased compared to normal operating conditions that the temperature of the reformer 11 is greater than the activation temperature of the catalyst of the reformer 11. In this manner, it is possible to provide a fuel cell system capable of detailed response control.

In a step S9, a final response time Rt of the fuel cell system is calculated using the calculation formula: Rt=Rtm/(C1× C2×C3×C4) based on the correction coefficients C1-C4 and the basic response time Rtm calculated as described above. In this manner, it is possible to prevent deterioration of the battery 18 by calculating a more accurate response system time Rt. This is achieved by correcting the basic response time Rtm of the system based on the reformer temperature Tr, the ambient temperature Ta, the SOC of the battery, the dimension La of the required load and the amount of variation Lv therein.

Figure 9B:
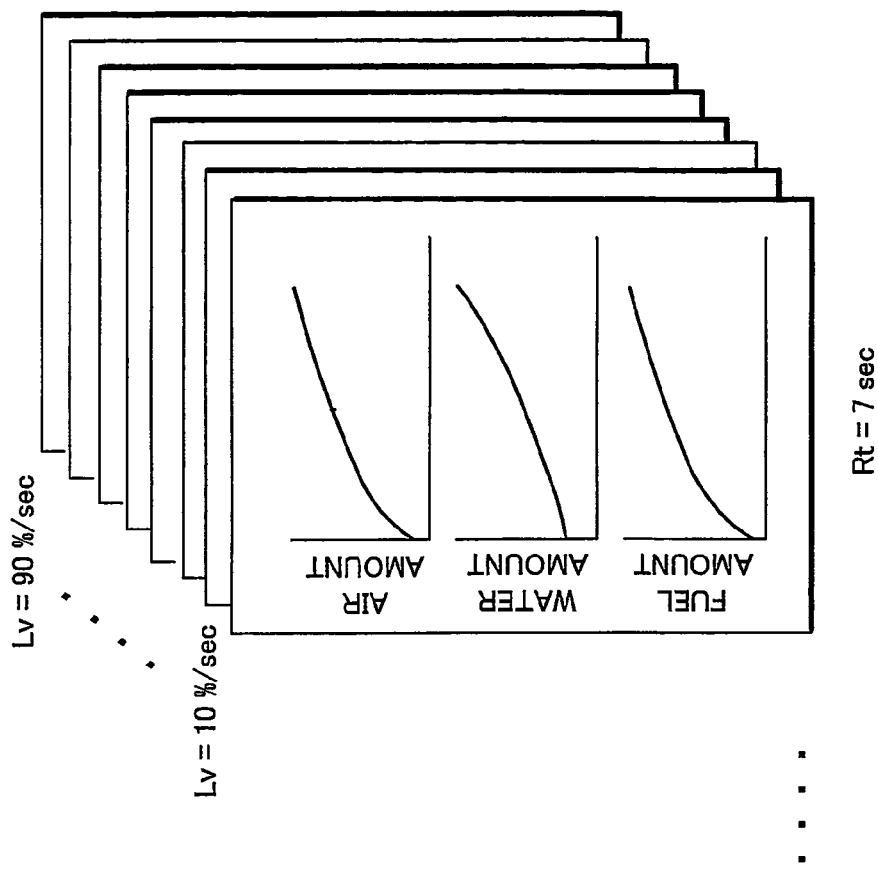
FIG. 9 is a collection of maps corresponding to the response time Rt showing the temporal variation in the flow rate of fuel, water and air.
Figure 9A:
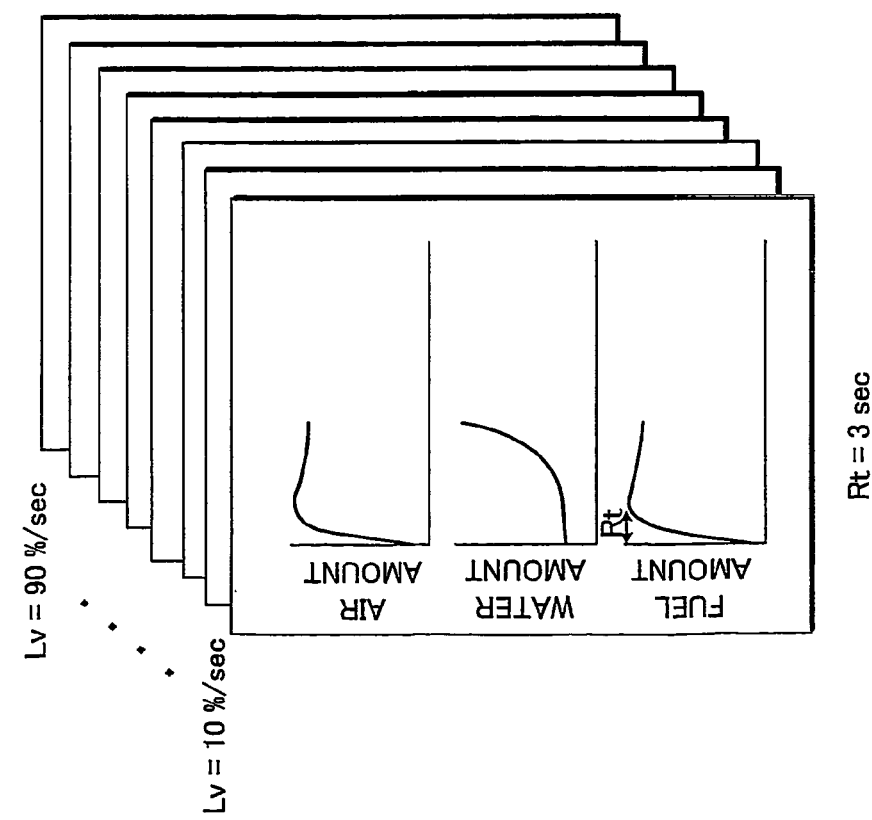

In a step S11, one map is selected from the maps shown in FIG. 9 in response to the set response time Rt in the step S9 or the step S10 and the rate of change Lv (%/sec) in the load. The controller 16 controls the flow rate of fuel by regulating the opening of the fuel flow rate control valve 23 based on the read map. The collection of maps in FIG. 9 is stored in the memory of the controller 16. According to these maps, the supply amount (flow rate) of fuel, water, and air supplied to the reformer 11 is rapidly increased as the response time Rt decreases. As shown in FIG. 9, the response time Rt substantially represents the time until the supply amount of fuel reaches a target value. Thus the controller 16 hastens the generation of a target flow rate of hydrogen-containing reformate gas to the fuel cell 12 by controlling the flow rate of fuel to the reformer 11, as the calculated response time Rt decreases.

Instead, the supply amount of reformate gas to the fuel cell may be controlled by controlling the flow rate control valve 29 based on the set response time Rt, in a step S11. Thus the controller 16 may control the supply of reformate gas to the fuel cell according to the response time Rt calculated above. The controller 16 may expedite the achievement of a target flow rate of reformate gas to the fuel cell via the flow rate control valve 29 according to decreases in the response time Rt.

The embodiment above is related to a fuel cell system using a reformer as a source of hydrogen for the fuel cell. When the reformer is omitted and high-pressure hydrogen tank acting as a hydrogen source for the fuel cell is used as a fuel tank 10, in the step S11, the supply amount of hydrogen to the fuel cell is controlled by the controller 16 using the flow rate control valve 23. In this case, the controller 16 expedites the achievement of a target flow rate of hydrogen gas from the hydrogen tank to the fuel cell according to decreases in the response time Rt calculated in the above embodiment. The controller 16 calculates the target flow rate of hydrogen gas according to the required power of the motor 13, and at the target flow rate of hydrogen gas, the fuel cell 12 can generate the required power of the motor 13.

Furthermore with respect to control of the SOC, it is of course possible to improve the response speed of the fuel cell system when the SOC is an extremely low.

The entire contents of Japanese Patent Application P2002-46260 (filed Feb. 22, 2002) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

INDUSTRIAL APPLICABILITY

A fuel cell system according to this invention can be used as an electronic power supply, especially as an electronic power supply mounted on an electric vehicle provided with an electric motor.

The invention claimed is:

1. A control device for controlling a fuel cell system connected to a motor and a rechargeable battery, and provided with a fuel cell and a reformer for producing hydrogen-rich reformate gas supplied to the fuel cell, the fuel cell system and the rechargeable battery supplying the motor with electrical power, the control device comprising:
   a temperature sensor for detecting a temperature of the rechargeable battery;
   a load sensor for detecting a required power for the motor;
   means for detecting a state of charge (SOC) of the rechargeable battery;
   a controller coupled to the temperature sensor and the load sensor, the controller functioning to:
      calculate a response time of the reformer with respect to the production of hydrogen-rich reformate gas based on the detected temperature of the rechargeable battery when detecting a change in the required power for the motor and based on the detected SOC of the rechargeable battery; and
      control the production of hydrogen-rich reformate gas from the reformer according to the calculated response time,
   wherein the response time of the reformer with respect to the production of hydrogen-rich reformate gas increases as the detected SOC of the rechargeable battery increases; and
   wherein the controller further detects a variation in the required power for the motor and decreases the response time of the reformer with respect to the production of hydrogen-rich reformate gas based on an increase in a frequency of the occurrence that the detected variation in the required power for the motor is greater than a first threshold value and the required power for the motor is greater than a second threshold value;
   a temperature sensor for detecting an ambient temperature of an external portion of the fuel cell system; and
   a temperature sensor for detecting a temperature of the reformer, wherein
   the controller corrects the response time of the reformer with respect to the production of hydrogen-rich reformate gas based on the detected ambient temperature and the detected temperature of the reformer.

2. The control device as defined in claim 1, further comprising a fuel tank connected to the reformer and a fuel flow rate control valve for regulating the flow rate of fuel supplied to the reformer,
   wherein the controller controls the opening of the fuel flow rate control valve so as to control the production of hydrogen-rich reformate gas in response to the calculated response time.

3. The control device as defined in claim 1, further comprising a power control circuit, wherein the controller controls the supply/discharge of power to/from the rechargeable battery via the power control circuit, based on the detected temperature of the rechargeable battery.

4. The control device as defined in claim 1, wherein the controller comprises a map specifying a relation between the response time and temperature of the rechargeable battery as follows:

the response time increases with increasing battery temperature below a predetermined battery temperature, and decreases with increasing battery temperature above the predetermined battery temperature, taking a maximum value at the predetermined battery temperature, and when the battery temperature approaches a maximum permissible temperature, the response time is reduced substantially to zero so as to increase the response speed of the reformer, wherein the controller calculates the response time based on the map.

5. A control method for controlling a fuel cell system connected to a motor and a rechargeable battery, and provided with a fuel cell and a reformer for producing hydrogen-rich reformate gas supplied to the fuel cell, the fuel cell system and the rechargeable battery supplying the motor with electrical power, the control method comprising:

detecting a temperature of the rechargeable battery;

detecting a required power for the motor;

detecting a state of charge (SOC) of the rechargeable battery;

detecting an ambient temperature of an external portion of the fuel cell system;

detecting a temperature of the reformer;

calculating a response time of the reformer with respect to the production of hydrogen-rich reformate gas based on the detected temperature of the rechargeable battery when detecting a change in the required power for the motor and based on the detected SOC of the rechargeable battery;

detecting a variation in the required power for the motor and decreasing the response time of the reformer with respect to the production of hydrogen-rich reformate gas based on an increase in a frequency of the occurrence that the detected variation in the required power for the motor is greater than a first threshold value and the required power for the motor is greater than a second threshold value;

controlling the production of hydrogen-rich reformate gas according to the calculated response time; and correcting the response time of the reformer with respect to the production of hydrogen-rich reformate gas based on the detected ambient temperature and the detected temperature of the reformer, wherein the response time of the reformer with respect to the production of hydrogen-rich reformate gas increases as the detected SOC of the rechargeable battery increases.

6. The control device as defined in claim 1, comprising a temperature sensor for detecting an ambient temperature of the external portion of the fuel cell system, wherein the response time of the reformer with respect to the production of hydrogen-rich reformate gas decreases as the detected ambient temperature increases.

* * * * *